M. LEINER.
Ear-Cleaners.

No. 147,660. Patented Feb. 17, 1874.

WITNESSES:

INVENTOR:
BY
ATTORNEYS.

UNITED STATES PATENT OFFICE.

MORITZ LEINER, OF NEW YORK, N. Y.

IMPROVEMENT IN EAR-CLEANERS.

Specification forming part of Letters Patent No. 147,660, dated February 17, 1874; application filed December 29, 1873.

*To all whom it may concern:*

Be it known that I, MORITZ LEINER, of the city, county, and State of New York, have invented a new and useful Improvement in Ear-Cleaners, of which the following is a specification:

The object of this invention is to furnish an instrument for cleaning the ear which shall be cheap, simple, and effective; and it consists in a twisted stem of metal, having a swab or bulb of some soft elastic substance at one end, attached by an eye in the end of the stem, and a spoon or scraper at the other end of the stem.

Figure 1:
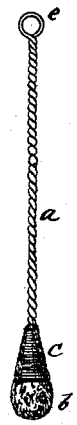
Figure 2:
Figure 3:

In the accompanying drawing, Figure 1 is a view of the instrument constructed with a single eye at the end, which may be used for loosening the wax in the ear, the swab at the other end being afterward used for cleaning. Fig. 2 is a view of the instrument, showing a spoon at the end of the stem. Fig. 3 represents the stem with the swab detached, and with an eye slightly bent on one side, to render it more convenient for using.

Similar letters of reference indicate corresponding parts.

$a$ is the stem, which is preferably made of plated twisted wire, as seen in the drawing; but it may be made of untwisted wire, with an eye or similar device for fastening the swab at one end, and with a spoon of any suitable form at the other. $b$ is the swab, which is made of soft sponge, or any soft elastic substance, and is attached by means of thread $c$, wound around the upper part of the sponge and onto the stem above the eye $d$, so as to firmly fasten the swab to the stem, as seen in the drawing. $e$ is the spoon on the opposite end of the stem. This spoon may be soldered on, or the eye may be flattened, so that it may serve as a spoon, or the simple round-wire eye, as seen in Fig. 1, may serve as such.

By making a spoon on one end, and a swab on the other, the cleaning of the ear is effected with one instrument.

The swab is used wet, or moistened with soap-suds or water, or other liquid, to insure a thorough cleansing of the ear, and it dries readily when exposed to the air, which renders it durable, as it is not liable to mold when laid away.

Having thus described my invention, I claim as new and desire to secure by Letters Patent—

The ear-cleaner herein described, consisting of the handle $a$, made of twisted wire, furnished with a loop, $d$, for attachment of the swab $b$, with or without a spoon, $e$, constructed and relatively arranged substantially as set forth.

MORITZ LEINER.

Witnesses:
T. B. MOSHER,
ALEX. F. ROBERTS.